(12) United States Patent
Ahn

(10) Patent No.: US 11,677,970 B2
(45) Date of Patent: Jun. 13, 2023

(54) VIDEO CODING METHOD AND DEVICE USING MOTION COMPENSATION OF DECODER SIDE

(71) Applicant: INTELLECTUAL DISCOVERY CO., LTD., Seoul (KR)

(72) Inventor: Yong Jo Ahn, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 17/256,295

(22) PCT Filed: Jul. 1, 2019

(86) PCT No.: PCT/KR2019/007975
§ 371 (c)(1),
(2) Date: Dec. 28, 2020

(87) PCT Pub. No.: WO2020/005042
PCT Pub. Date: Jan. 2, 2020

(65) Prior Publication Data
US 2021/0185337 A1   Jun. 17, 2021

(30) Foreign Application Priority Data

Jun. 29, 2018   (KR) .................. 10-2018-0075932

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11); *H04N 19/176* (2014.11); *H04N 19/513* (2014.11)

(58) Field of Classification Search
None
See application file for complete search history.

(56) References Cited

U.S. PATENT DOCUMENTS 10,986,367 B2 *   4/2021   Lee .................. H04N 19/52
2013/0177076 A1   7/2013   Itani et al.
(Continued)

FOREIGN PATENT DOCUMENTS

CN         107454403 A       12/2017
KR   10-2017-0058866 A        5/2017
(Continued)

OTHER PUBLICATIONS

Wu (NPL JVET-J0032) (Year: 2018).*
(Continued)

*Primary Examiner* — Shadan E Haghani
(74) *Attorney, Agent, or Firm* — Sughrue Mion, PLLC

(57) ABSTRACT

A video coding method and device, according to the present invention, determine whether motion compensation is performed by sub-block unit, determine a search area for motion compensation of a current block, calculate a plurality of SAD candidates with respect to the search area, derive delta motion information of the current block on the basis of the plurality of SAD candidates, and can compensate for motion information of the current block by using pre-generated motion information and the delta motion information of the current block.

13 Claims, 9 Drawing Sheets

(51) Int. Cl.
  *H04N 19/132* (2014.01)
  *H04N 19/176* (2014.01)
  *H04N 19/513* (2014.01)

(56) References Cited

U.S. PATENT DOCUMENTS

| 2018/0184117 | A1 | 6/2018 | Chen et al. | |
| 2018/0359483 | A1* | 12/2018 | Chen | H04N 19/70 |
| 2019/0132606 | A1* | 5/2019 | Su | H04N 19/543 |
| 2021/0021847 | A1* | 1/2021 | Moon | H04N 19/52 |

FOREIGN PATENT DOCUMENTS

| KR | 10-2017-0131446 A | 11/2017 | | |
| KR | 10-2018-0061060 A | 6/2018 | | |
| WO | 2018/065296 A1 | 4/2018 | | |
| WO | WO-2018121506 A1 * | 7/2018 | | H04N 19/105 |

OTHER PUBLICATIONS

Xiu (JVET-J0015) (Year: 2018).*
Chen (NPL JVET-G1001) (Year: 2017).*
Semih Esenlik et al., "Description of Core Experiment 9 (CE9): Decoder Side Motion Vector Derivation", Joint Video Exploration Team (JVET) of ITU-T SG 16 WP 3 and ISO/IEC JTC 1/SC 29/WG 11 10th Meeting, 2018, pp. 1-34, JVET-J1029_r4, pp. 1-34.
International Search Report of PCT/KR2019/007975 dated Oct. 16, 2019 [PCT/ISA/210].
Written Opinion of PCT/KR2019/007975 dated Oct. 16, 2019 [PCT/ISA/237].
Office Action dated Mar. 20, 2023 in Chinese Application No. 201980043825.2.

* cited by examiner

VIDEO CODING METHOD AND DEVICE USING MOTION COMPENSATION OF DECODER SIDE

CROSS REFERENCE TO RELATED APPLICATIONS

This application is a National Stage of International Application No. PCT/KR2019/007975 filed on Jul. 1, 2019, claiming priority based on Korean Patent Application No. 10-2018-0075932 filed on Jun. 29, 2018.

TECHNICAL FIELD

The present invention relates to video coding techniques. In particular, the present invention relates to a motion modification technique at the decoder side among video coding techniques.

BACKGROUND ART

The market demand for high-resolution video is increasing, and accordingly, a technology capable of efficiently compressing high-resolution images is required. In response to such market demand, ISO/IEC's Moving Picture Expert Group (MPEG) and ITU-T's VCEG (Video Coding Expert Group) jointly formed JCT-VC (Joint Collaborative Team on Video Coding), High Efficiency Video Coding (HEVC) video compression standard was developed in January 2013, and research and development for the next generation compression standard have been actively conducted.

Video compression is largely composed of intra prediction, inter prediction, transform, quantization, entropy coding, in-loop filter. Meanwhile, as the demand for high-resolution images increases, the demand for 3D image contents as a new image service is also increasing. Discussion is underway on a video compression technique for effectively providing 3D video contents with high-resolution and ultra-high-resolution.

DISCLOSURE

Technical Problem

An object of the present disclosure is to provide an image encoding/decoding method and apparatus with improved efficiency.

In addition, an object of the present invention is to provide a video coding method and apparatus for performing efficient motion modification in an image encoding/decoding method and apparatus.

In addition, an object of the present disclosure is to provide a computer-readable recording medium storing a bitstream generated by the image encoding method/apparatus.

Technical Solution

An image encoding/decoding method and apparatus according to the present invention determine whether motion modification is performed in units of sub-blocks, determine a search region for motion modification of a current block, calculate a plurality of SAD candidates for the search region, derive delta motion information of the current block based on the plurality of SAD candidates, and modify motion information of the current block by using pre-generated motion information of the current block and the delta motion information.

In the video encoding/decoding method and apparatus according to the present invention, whether the motion modification is performed in units of sub-blocks may be determined based on the size of the current block.

In the video encoding/decoding method and apparatus according to the present invention, the search region is determined as a region including at least one of a reference block or a neighboring region of the reference block, and the neighboring region may be N sample lines neighboring to a boundary of the reference block.

In the video encoding/decoding method and apparatus according to the present invention, the SAD candidate may be determined as an SAD value between an L0 block and an L1 block, and the L0 block may be determined based on a position of an L0 reference block of the current block and a predetermined offset. The L1 block may be determined based on a position of an L1 reference block of the current block and the predetermined offset.

In the method and apparatus for encoding/decoding an image according to the present invention, the SAD candidate may be determined based on some samples of the L0 block and the L1 block.

In the image encoding/decoding method and apparatus according to the present invention, the offset may include at least one of a non-directional offset or a directional offset, and the directional offset may include an offset for at least one direction of a left, a right, a top, a bottom, a top-left, a top-right, a bottom-left or a bottom-right.

In the video encoding/decoding method and apparatus according to the present invention, the motion modification may be adaptively performed based on a comparison result between a reference SAD candidate and a predetermined threshold value, and the reference SAD candidate may mean an SAD candidate corresponding to a non-directional offset.

In the image encoding/decoding method and apparatus according to the present invention, the motion modification may be limitedly performed in consideration of at least one of a block size, a distance between a current picture and a reference picture, an inter prediction mode, a prediction direction, or a unit or a resolution of motion information.

Advantageous Effects

According to the present invention, an image encoding/decoding method and apparatus capable of efficient motion modification can be provided.

Further, a computer-readable recording medium for storing a bitstream generated by the image encoding method/apparatus according to the present disclosure may be provided.

BEST MODE

Figure 1:
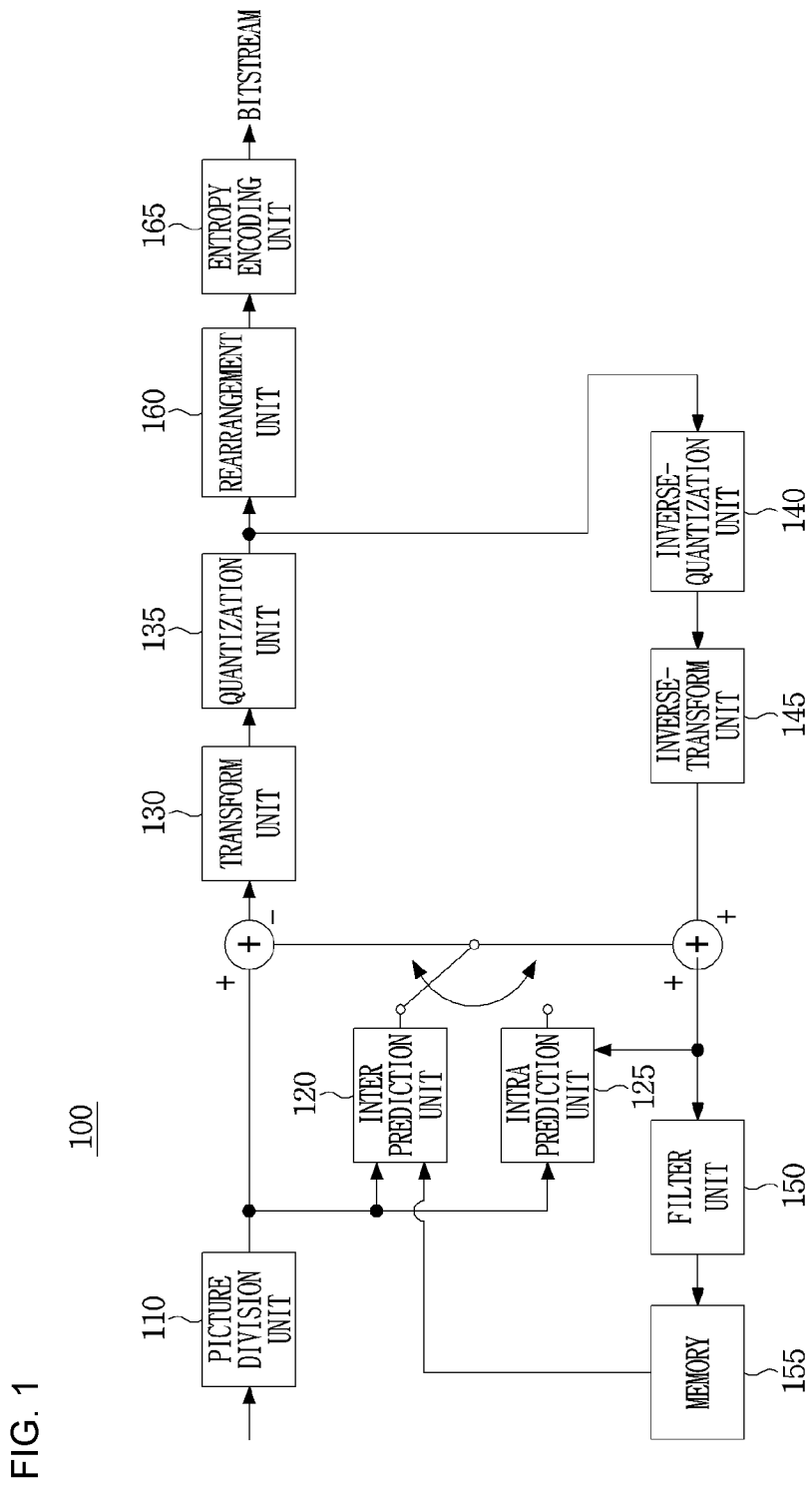
FIG. 1 is a block diagram illustrating an image encoding apparatus according to the present disclosure.

An image encoding/decoding method and apparatus according to the present invention determine whether motion modification is performed in units of sub-blocks, determine a search region for motion modification of a current block, calculate a plurality of SAD candidates for the search region, derive delta motion information of the current block based on the plurality of SAD candidates, and modify motion information of the current block by using pre-generated motion information of the current block and the delta motion information.

In the video encoding/decoding method and apparatus according to the present invention, whether the motion modification is performed in units of sub-blocks may be determined based on the size of the current block.

In the video encoding/decoding method and apparatus according to the present invention, the search region is determined as a region including at least one of a reference block or a neighboring region of the reference block, and the neighboring region may be N sample lines neighboring to a boundary of the reference block.

In the video encoding/decoding method and apparatus according to the present invention, the SAD candidate may be determined as an SAD value between an L0 block and an L1 block, and the L0 block may be determined based on a position of an L0 reference block of the current block and a predetermined offset. The L1 block may be determined based on a position of an L1 reference block of the current block and the predetermined offset.

In the method and apparatus for encoding/decoding an image according to the present invention, the SAD candidate may be determined based on some samples of the L0 block and the L1 block.

In the image encoding/decoding method and apparatus according to the present invention, the offset may include at least one of a non-directional offset or a directional offset, and the directional offset may include an offset for at least one direction of a left, a right, a top, a bottom, a top-left, a top-right, a bottom-left or a bottom-right.

In the video encoding/decoding method and apparatus according to the present invention, the motion modification may be adaptively performed based on a comparison result between a reference SAD candidate and a predetermined threshold value, and the reference SAD candidate may mean an SAD candidate corresponding to a non-directional offset.

In the image encoding/decoding method and apparatus according to the present invention, the motion modification may be limitedly performed in consideration of at least one of a block size, a distance between a current picture and a reference picture, an inter prediction mode, a prediction direction, or a unit or a resolution of motion information.

MODE FOR DISCLOSURE

Embodiments of the present disclosure will be described in detail with reference to the accompanying drawings in the present specification so that those of ordinary skill in the art can easily implement the present disclosure. The present disclosure may, however, be embodied in many different forms and should not be construed as limited to the embodiments set forth herein. In order to clearly illustrate the present disclosure, parts not related to the description are omitted, and similar parts are denoted by like reference characters throughout the specification.

Throughout this specification, when a part is referred to as being 'connected' to another part, it includes not only an example where they are directly connected but also an example where the part is electrically connected with another part in between.

In addition, when a part is referred to as 'comprising' an element throughout the specification, it is understood that the element may include other elements as well, without departing from the other elements unless specifically stated otherwise.

In addition, terms such as first and second may be used to describe various components, but the components should not be limited by the terms. These terms are used only for the purpose of distinguishing one component from another component.

In addition, in the embodiments of the apparatus and method described herein, some of the components of the apparatus or some of the steps of the method may be omitted. In addition, the order of some of the components of the apparatus or the order of some of the steps of the method may be changed. In addition, other components or other steps may be inserted in some of the components of the apparatus or in some of the steps of the method.

In addition, some of the components or steps of the first embodiment of the present disclosure may be added to the second embodiment of the present disclosure, or may replace some of the components or steps of the second embodiment.

In addition, the components shown in the embodiments of the present disclosure are shown independently to indicate different characteristic functions, and do not mean that each component is composed of separate hardware or one software component unit. That is, for convenience of description, each component is listed as each component, and at least two components of each component may be combined to form one component, or one component may be divided into a plurality of components to perform a function. The integrated and separated embodiments of each of these components are also included in the scope of the present disclosure without departing from the essence of the present disclosure.

First, the terms used in the present application will be briefly described as follows.

The decoding apparatus (Video Decoding Apparatus), which will be described later, may be a civil security camera, a civil security system, a military security camera, a military security system, a personal computer (PC), a notebook computer, a portable multimedia player (PMP), a wireless communication terminal, a smart phone, a apparatus included in a server terminal such as a TV application server and a service server, and may mean a user terminal such as various apparatus, a communication apparatus such as a communication modem for performing communication with a wired/wireless communication network, a memory for storing various programs and data for decoding an image or performing an inter prediction or intra prediction for decoding, various apparatus equipped with microprocessor, etc. for executing programs and calculating and controlling them.

In addition, an image encoded as a bitstream by an encoder may be transmitted to an image decoding apparatus through real-time or non-real-time wired/wireless communication networks such as the Internet, local area wireless communication networks, wireless LAN networks, WiBro networks, mobile communication networks, or through various communication interfaces such as cables, Universal Serial Bus (USB), etc., decoded, reconstructed as an image, and reproduced. Alternatively, the bitstream generated by the encoder may be stored in memory. The memory may include both volatile memory and non-volatile memory. In the present specification, the memory may be represented as a recording medium storing the bitstream.

In general, a video may be composed of a series of pictures, and each picture may be divided into a coding unit such as a block. In addition, a person with ordinary knowledge in the technical field to which this embodiment belongs may understand that the term 'a picture' described below may be used by replacing it with another term having an equivalent meaning such as 'an image' or 'a frame'. In addition, it will be understood by those of ordinary skill in the art to which this embodiment pertains that the term 'a coding unit' may be substituted for and used with other terms having the same meaning, such as 'a unit block' and 'a block'.

Hereinafter, exemplary embodiments of the present disclosure will be described in detail with reference to the accompanying drawings. In describing the present disclosure, redundant description of the same components will be omitted.

FIG. 1 is a block diagram showing an image encoding apparatus according to the present disclosure.

Referring to FIG. 1, the conventional image encoding apparatus 100 includes a picture division unit 110, a prediction unit 120, 125, a transform unit 130, a quantization unit 135, a rearrangement unit 160, and an entropy encoding unit 165, an inverse quantization unit 140, an inverse transform unit 145, a filter unit 150, and a memory 155.

The picture division unit 110 may divide the input picture into at least one processing unit. In this case, the processing unit may be a prediction unit (PU), a transform unit (TU), or a coding unit (CU). Hereinafter, in an embodiment of the present disclosure, a coding unit may be used as a meaning of a unit that performs encoding, or may be used as a meaning of a unit that performs decoding.

The prediction unit may be obtained by dividing in a shape such as at least one square or rectangle of the same size within one coding unit. One of prediction units divided within one coding unit may be obtained by dividing to have a different shape and/or size from the other prediction unit. In generating a prediction unit that performs intra prediction based on a coding unit, when it is not a minimum coding unit, intra prediction may be performed without dividing into a plurality of prediction units N×N.

The prediction units 120 and 125 may include an inter prediction unit 120 that performs inter prediction, and an intra prediction unit 125 that performs intra prediction. Whether to use inter prediction or intra prediction for a prediction unit may be determined, and specific information (e.g., intra prediction mode, motion vector, reference picture, etc.) according to each prediction method may be determined. The residual value (residual block) between the generated prediction block and the original block may be input to the transform unit 130. In addition, prediction mode information, motion vector information, and the like used for prediction may be encoded by the entropy encoding unit 165 together with the residual value and transmitted to the decoder. However, when the motion information derivation method of the decoder side according to the present disclosure is applied, the corresponding information is not transmitted to the decoder because the prediction mode information, motion vector information, and the like are not generated in the encoder. On the other hand, information indicating that the motion information is derived and used in the decoder side and information on a method used to derive the motion information may be signaled from the encoder.

The inter prediction unit 120 may predict a prediction unit based on information of at least one of a previous picture or a subsequent picture of the current picture, and in some cases, predict a prediction unit based on information of some regions, which encoding has been completed, in the current picture. The inter prediction unit 120 may include a reference picture interpolation unit, a motion prediction unit, and a motion compensation unit.

The reference picture interpolation unit may receive reference picture information from the memory 155 and generate pixel information of an integer pixel or less in the reference picture. In the case of a luma pixel, a DCT-based 8-tap interpolation filter (DCT-based interpolation filter) having different filter coefficients may be used to generate pixel information of an integer pixel or less in units of a ¼ pixels. In case of a chroma signal, a DCT-based 4-tap interpolation filter (DCT-based interpolation filter) having different filter coefficients may be used to generate pixel information of an integer pixel or less in units of ⅛ pixels.

The motion prediction unit may perform motion prediction based on the reference picture interpolated by the reference picture interpolation unit. As a method for calculating the motion vector, various methods such as Full Search-based Block Matching Algorithm (FBMA), Three Step Search (TSS), and New Three-Step Search Algorithm (NTS) may be used. The motion vector may have a motion vector value in units of ½ or ¼ pixels based on the interpolated pixels. The motion prediction unit may predict a current prediction unit by differently using a motion prediction method. Various methods such as a skip method, a merge method, an AMVP (Advanced Motion Vector Prediction) method, and an intra block copy method may be used as the motion prediction method. In addition, when applying the motion information derivation method of the decoder side according to the present disclosure, a template matching method and a bidirectional matching (bilateral matching) method using a motion trajectory may be applied as methods performed by the motion prediction unit. In connection with this, the template matching method and the bilateral matching method will be described in detail later in FIG. 3.

The intra prediction unit 125 may generate a prediction unit based on reference pixel information around a current block, which is pixel information in a current picture. When the neighboring block of the current prediction unit is a block that performs inter prediction and the reference pixel is a pixel that performs inter prediction, the reference pixel included in the block that performs inter prediction may be used by replacing it with reference pixel information of a block that performs intra prediction around it. That is, when the reference pixel is not available, the unavailable reference pixel information may be used by replacing with at least one reference pixel among the available reference pixels.

In addition, a residual block including residual information that is a difference value between the prediction unit that performs prediction based on the prediction units generated by the prediction units 120 and 125 and the original block of the prediction unit may be generated. The generated residual block may be input to the transform unit 130.

The transform unit 130 may transform a residual block including residual information between a prediction unit generated by the prediction units 120 and 125 and the original block by using the transform method such as DCT (Discrete Cosine Transform), DST (Discrete Sine Transform), and KLT. Whether DCT, DST, or KLT is applied to transform the residual block may be determined based on intra prediction mode information of a prediction unit used to generate the residual block.

The quantization unit 135 may quantize values transformed to the frequency domain by the transform unit 130. The quantization coefficient may vary depending on the block or the importance of the image. The value calculated by the quantization unit 135 may be provided to the inverse quantization unit 140 and the rearrangement unit 160.

The rearrangement unit 160 may perform the rearrangement of the coefficient value for the quantized residual value.

The rearrangement unit 160 may change coefficients of 2-dimensional block form into 1-dimensional vector form through a coefficient scanning method. For example, the rearrangement unit 160 may change into a 1-dimensional vector form by scanning from a DC coefficient to a coefficient in a high frequency region according to a Zig-Zag Scan method. Depending on the size of the transform unit and the intra prediction mode, a vertical scan of scanning coefficients of two-dimensional block form in a column direction and a horizontal scan of scanning coefficients of two-dimensional block form in a row direction may be used instead of a zig-zag scan. That is, depending on the size of the transform unit and the intra prediction mode, it may be determined which one of a zigzag scan, a vertical scan, and a horizontal scan is used.

The entropy encoding unit 165 may perform entropy-encoding based on values calculated by the rearrangement unit 160. Various encoding methods, such as exponential Golomb, CAVLC (Context-Adaptive Variable Length Coding), and CABAC (Context-Adaptive Binary Arithmetic Coding), may be used for entropy-encoding. In relation to this, the entropy encoding unit 165 may encode residual value coefficient information of a coding unit from the rearrangement unit 160 and the prediction units 120 and 125. In addition, according to the present disclosure, information indicating that the motion information is derived and used in the decoder side and information on a method used to derive the motion information may be signaled from the encoder.

The inverse quantization unit 140 and the inverse transform unit 145 inverse-quantize the values quantized by the quantization unit 135 and inverse-transform the values transformed by the transform unit 130. The reconstructed block may be generated by combining the residual value generated by the inverse quantization unit 140 and the inverse transform unit 145 with the prediction unit predicted through the motion estimation unit, the motion compensation unit, and the intra prediction unit included in the prediction units 120 and 125.

The filter unit 150 may include at least one of a deblocking filter, an offset modification unit, and an adaptive loop filter (ALF). The deblocking filter may remove block distortion caused by boundary between blocks in the reconstructed picture. The offset modification unit may correct an offset from the original image in units of pixels for the deblocking-filtered image. In order to perform offset modification for a specific picture, after classifying the pixels included in the image into a certain number of regions and determining the region to which the offset is applied, a method of applying the offset to the region offset or a method of applying the offset by considering edge information of each pixel may be used. ALF (Adaptive Loop Filtering) may be performed based on a value obtained by comparing a filtered reconstructed image with an original image. After classifying the pixels included in the image into a predetermined group, one filter to be applied to the group may be determined to perform filtering differently for each group.

The memory 155 may store the reconstructed block or picture output from the filter unit 150, and the stored reconstructed block or picture may be provided to the prediction units 120 and 125 when performing inter prediction.

Figure 2:
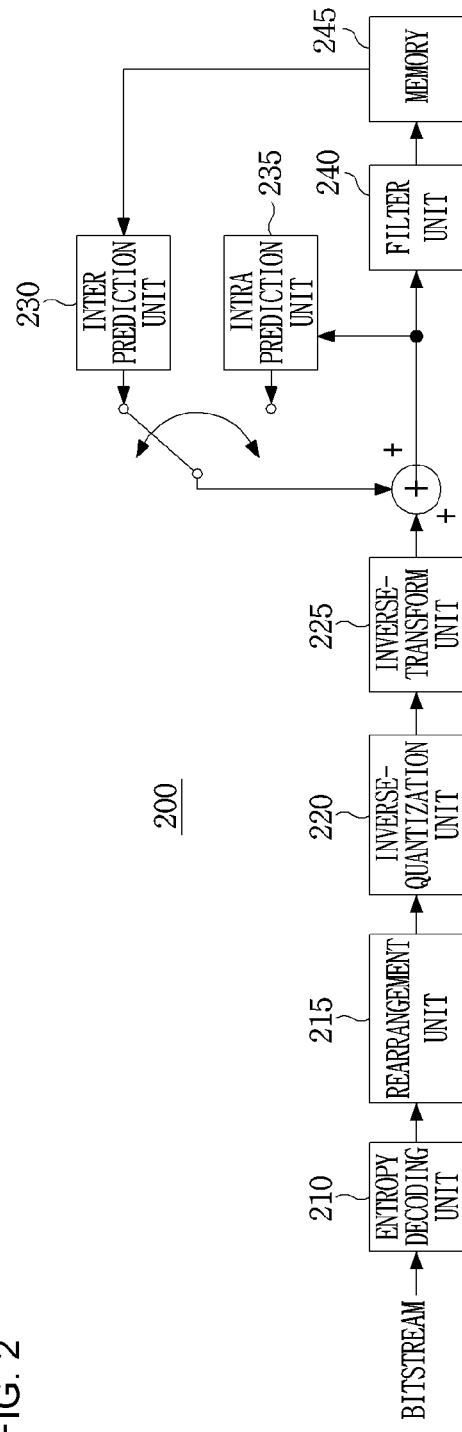
FIG. 2 is a block diagram illustrating an image decoding apparatus according to the present disclosure.

FIG. 2 is a block diagram showing an image decoding apparatus according to the present disclosure.

Referring to FIG. 2, the image decoder 200 may include an entropy decoding unit 210, a rearrangement unit 215, an inverse quantization unit 220, an inverse transform unit 225, a prediction unit 230, 235, and a filter unit 240, a memory 245.

When an image bitstream is input from the image encoder, the input bitstream may be decoded in a procedure opposite to that of the image encoder.

The entropy decoding unit 210 may perform entropy-decoding in a procedure opposite to that performed by entropy-encoding in the entropy encoding unit of the image encoder. For example, various methods corresponding to the method performed in the image encoder such as Exponential Golomb (CAVLC), Context-Adaptive Variable Length Coding (CAVLC), and Context-Adaptive Binary Arithmetic Coding (CABAC) may be applied.

The entropy decoding unit 210 may decode information related to intra prediction and inter prediction performed by the encoder.

The rearrangement unit 215 may perform rearrangement of the bitstream entropy-decoded by the entropy decoding unit 210 based on a rearrangement method of the encoding unit. The coefficients of a 1-dimensional vector form may be rearranged into coefficients of a 2-dimensional block form again.

The inverse quantization unit 220 may perform inverse quantization based on the quantization parameter provided by the encoder and the coefficients of the rearranged block.

The inverse transform unit 225 may perform inverse transform, that is, inverse DCT, inverse DST, and inverse KLT, corresponding to transforms performed by the transform unit, that is, DCT, DST, and KLT for the quantization results performed by the image encoder. The inverse transform may be performed based on the transmission unit determined by the image encoder. In the inverse transform unit 225 of the image decoder, a transform type (for example, DCT, DST, KLT) may be selectively performed according to a plurality of information such as a prediction method, a size of a current block, and a prediction direction.

The prediction units 230 and 235 may generate a prediction block based on prediction block generation related information provided by the entropy decoding unit 210 and previously decoded block or picture information provided by the memory 245.

As described above, when a size of the prediction unit and a size of the transform unit are the same in performing intra prediction in the same manner as in the image encoder, the intra prediction of the prediction unit may be performed based on pixels located on the left, the top-left and the top of the prediction unit. However, when the size of the prediction unit and the size of the transform unit are different in performing intra prediction, the intra prediction may be performed using a reference pixel based on the transform unit. In addition, the intra prediction using N×N division may be used only for the minimum coding unit.

The prediction unit 230 and 235 may include at least one of a prediction unit determination unit, an inter prediction unit, and an intra prediction unit. The prediction unit determination unit may receive various information from the entropy decoding unit 210 such as prediction unit information, prediction mode information of an intra prediction method, and motion prediction related information of an inter prediction method, classify the prediction unit from the current coding unit, and determine whether the prediction unit performs inter prediction or intra prediction. On the other hand, if the motion prediction related information for the inter prediction is not transmitted, and instead, information indicating that the motion information is derived and used in the decoder side and information about a method used to derive the motion information is transmitted from the encoder 100, the prediction unit determination unit determines the prediction performance of the inter prediction unit 230 based on the information transmitted from the encoder 100.

The inter prediction unit 230 may perform inter prediction for a current prediction unit based on information included in at least one of a previous picture or a subsequent picture of the current picture including the current prediction unit, by using information required for inter prediction of the current prediction unit provided by the image encoder. In order to perform inter prediction, a motion prediction method of a prediction unit included in a coding unit may be determined among a skip mode, a merge mode, an AMVP mode, and an intra block copy mode. Alternatively, the inter prediction unit 230 may perform inter prediction by deriving motion information from information indicating that the motion information is derived and used in the decoder side and information on a method used to derive the motion information, provided by the image encoder.

The intra prediction unit 235 may generate a prediction block based on pixel information in the current picture. When the prediction unit is a prediction unit that has performed intra prediction, intra prediction may be performed based on intra prediction mode information of a prediction unit provided by an image encoder. The intra prediction unit 235 may include an adaptive intra smoothing (AIS) filter, a reference pixel interpolation unit, and a DC filter. The AIS filter is a part that performs filtering on the reference pixel of the current block and may be applied by determining whether to apply the filter according to the prediction mode of the current prediction unit. AIS filtering may be performed on a reference pixel of a current block by using prediction mode and AIS filter information of a prediction unit provided by an image encoder. When the prediction mode of the current block is a mode that does not perform AIS filtering, the AIS filter may not be applied.

When the prediction mode of the prediction unit is the prediction unit that performs intra prediction based on the pixel value obtained by interpolating the reference pixel, the reference pixel interpolation unit may interpolate the reference pixel to generate a reference pixel of an integer pixel or less. When the prediction mode of the current prediction unit is a prediction mode in which a prediction block is generated without interpolating a reference pixel, the reference pixel may not be interpolated. The DC filter may generate a prediction block through filtering when the prediction mode of the current block is the DC mode.

The reconstructed block or picture may be provided to the filter unit 240. The filter unit 240 may include a deblocking filter, an offset modification unit, and an ALF.

Information about whether a deblocking filter is applied to a corresponding block or picture and information about whether a strong filter is applied or a weak filter is applied in applying the deblocking filter may be provided from a video encoder. In the deblocking filter of the video decoder, information related to the deblocking filter provided by the video encoder may be provided, and the video decoder may perform deblocking filtering on the corresponding block.

The offset modification unit may perform offset modification on the reconstructed image based on a type of offset modification and offset value information applied to the image during encoding. ALF may be applied to a coding unit based on information on whether to apply ALF, ALF coefficient information, and the like, provided by an encoder. This ALF information may be provided from a specific parameter set.

The memory 245 may store the reconstructed picture or block so that it can be used as a reference picture or a reference block, and may also provide the reconstructed picture to an output unit.

Figure 3:
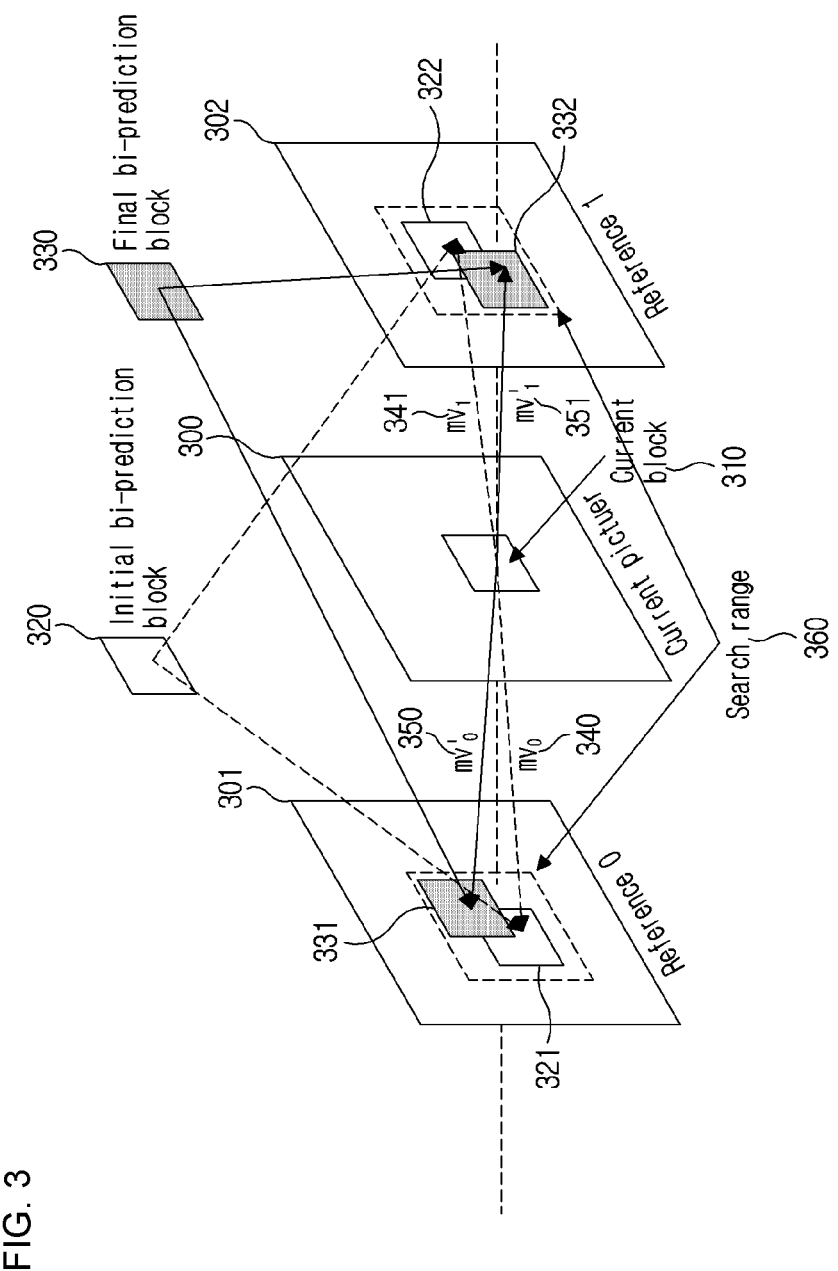
FIG. 3 is a diagram illustrating a concept of a technique for modifying motion at the decoder side.

FIG. 3 is a diagram showing the concept of a technique for modifying motion in a decoder side. In particular, FIG. 3 is a diagram showing the concept of a technology for modifying motion in a decoder side. In the case of a motion modification technology on the decoder side, when the current block is a block predicted by bi-prediction, the decoder modifies motion by performing an additional motion prediction process based on a prediction block generated by a predetermined prediction method. In the present invention, the operation and procedure of the motion modification technique on the decoder side will be described later. In this specification, the motion means motion information, and the motion information may include at least one of a motion vector, a reference picture index, or a prediction direction.

When the current block 310 in the current picture 300, which is the current encoding and decoding target, is predicted using bi-prediction, a motion modification technique at the decoder side proposed in the present invention may be applied.

As shown in FIG. 3, the current block 310 is a bi-directional prediction block, and a reference block 321 in the L0 direction and a reference block 322 in the L1 direction using a motion 340 in the L0 direction and a motion 341 in the L1 direction are used as prediction blocks.

In this case, the bi-directional predicted prediction block is a block 320, which means a block having the same size as the current block 310 generated by the weighted sum of the reference block 321 in the L0 direction and the reference block 322 in the L1 direction.

In this case, the weight for the weighted sum is n:m, and n and m may be integers other than 0. For example, the absolute value of n is a natural number greater than or equal to 1 and less than or equal to 10. n may be positive or negative. m may be derived as (8-n). In this case, when the weight ratio is 1:1, the 320 block may be a block having an average value of reference blocks in two different directions.

In the case of conventional bi-directional prediction, the bi-directional predicted prediction block 320 is used as a final prediction block of the current block.

The motion modification technology at the decoder side proposed in the present invention modifies motion to have an optimal rate-distortion value by performing additional motion prediction within a certain search range in the decoder based on the bi-directional predicted prediction block 320. Hereinafter, a reference block in the L0 direction and a reference block in the L1 direction will be referred to as an L0 prediction block and an L1 prediction block, respectively. The pixels inside a predetermined search range 360 including the L0 prediction block 321 and the L1 prediction block 322, respectively are traversed, and the prediction block 320 and the motion at which the rate-distortion value with the prediction block 320 is minimum is searched for each direction.

In this case, by performing a search for a block having a motion whose rate-distortion value with the prediction block 320 is the minimum in the search range in the L0 direction, the modified motion information 350 in the L0 direction and the new prediction block in the L0 direction 331 are determined.

In the same way, by performing a search for a block having a motion whose rate-distortion value with the prediction block 320 is the minimum in the search range in the L1 direction, the modified motion information 351 in the L1 direction and the new prediction block in the L1 direction 332 are determined.

A final bi-directional prediction block 330 performing motion modification at a decoder side is obtained based on a weighted sum of the newly determined prediction blocks 331 and 332 in the L0 direction and the L1 direction.

Figure 4:
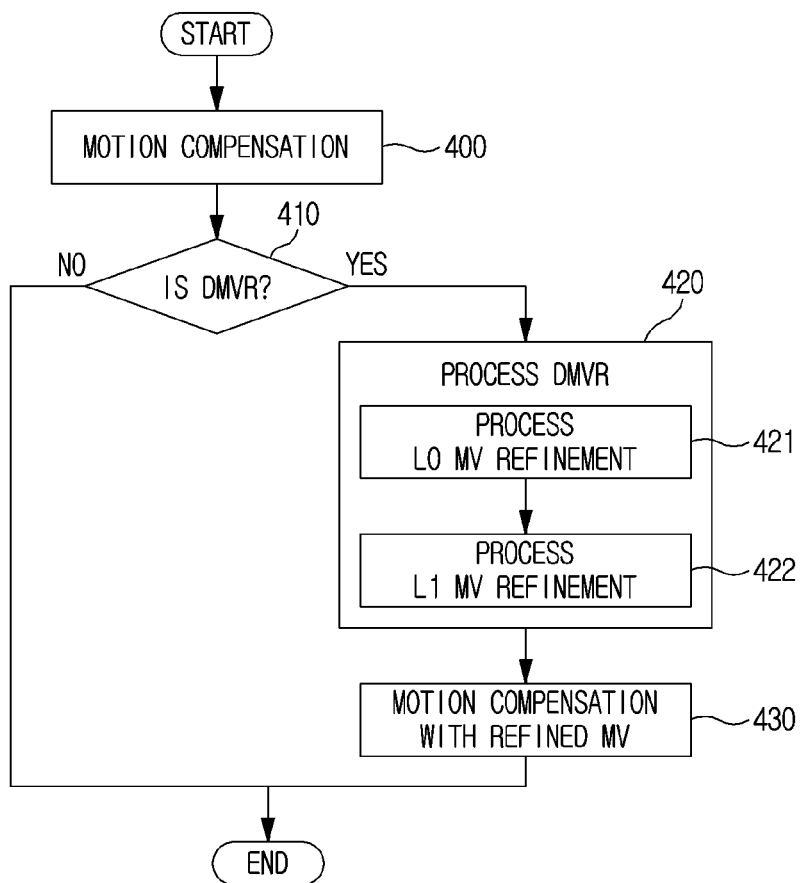
FIG. 4 is a diagram illustrating a flowchart of a motion modification technique at the decoder side.

FIG. 4 is a diagram showing a flowchart of a motion modification technique on the decoder side. In particular, FIG. 4 is a diagram showing a flow chart of a motion modification technique on the decoder side, and the motion modification technique on the decoder side is a technology for modifying motion by performing an additional motion prediction process in a decoder based on the prediction block generated by a predetermined prediction method when the current block is a block predicted by bi-prediction.

As shown in FIG. 4, the motion modification technology at the decoder side is based on performing a conditional operation in relation to motion compensation. The flow of motion compensation using a motion compensation technique at the decoder side includes a motion derivation and/or motion compensation step 400 according to a predetermined inter prediction mode, and includes a motion modification performance determination unit 410 at the decoder side; a motion modification performance unit 420 at the decoder side; and a motion compensation step 430 based on the modified motion.

The motion modification performance determining unit 410 on the decoder side determines whether the current block performs motion modification. The determination is performed using encoding mode information of a current coding unit, an inter prediction directionality, a block size, a distance between a current picture and a reference picture, a prediction mode, a prediction direction, a unit or a resolution of motion information, without signaling information for performing motion modification at the decoder side in units of coding units. However, signaling at the sequence level for performing motion modification at the decoder side may be performed.

In this case, as an embodiment using the inter prediction directionality, when bi-directional prediction is not performed, motion modification at the decoder side is not performed. However, even when bi-directional prediction is performed, motion modification at the decoder side is not performed in case of bi-directional prediction using the same temporal direction.

The encoding mode information of the current coding unit may include whether to merge motion of the current prediction unit, whether to perform affine transform prediction. In an embodiment, when the current prediction unit performs motion merging, motion modification at the decoder side may be performed.

The encoding mode information of the current coding unit may include whether to merge motion of the current prediction unit, whether to perform affine transform prediction.

In an embodiment, when the current prediction unit performs motion merging, motion modification at the decoder side may be performed. However, in the case of a motion merge candidate that performs sub-block unit motion prediction among the motion merge candidates, motion modification at the decoder side is not performed.

In an embodiment, when the current prediction unit performs affine transform prediction, motion modification at the decoder side is not performed.

Motion modification on the decoder side may be performed only when any one of the width or the height of the current block is greater than or equal to 8, 16, or 32. Alternatively, motion modification at the decoder side may be performed only when the width and the height of the current block are greater than or equal to 8, 16, or 32. Alternatively, motion modification at the decoder side may be performed only when the area or the number of samples of the current block is greater than or equal to 64, 128, or 256.

Motion modification at the decoder side may be performed only when the picture order count (POC) difference between the current picture and the L0 reference picture and the POC difference between the current picture and the L1 reference picture are the same.

Motion modification at the decoder side may be performed only when the ratio of the weights for bi-directional prediction is 1:1.

Motion modification at the decoder side may be performed only when the unit of motion is an integer pel, or motion modification at the decoder side may be performed only when the unit of motion is equal to or less than the quarter pel or half pel.

Motion modification on the decoder side may be performed only when the prediction mode of the current block is not the mixed prediction mode. The mixed prediction mode is a prediction mode based on a combination of intra prediction and inter prediction, and may mean a mode in which an intra-predicted pixel and an inter-predicted pixel are respectively calculated, and weighted prediction of both pixels is performed.

The motion modification at the decoder side may be performed only when the current block does not perform motion modification based on predetermined offset information. Here, the offset information may include at least one of the length, the direction, or the resolution (or accuracy) of the offset vector. That is, motion modification may be performed by specifying an offset vector based on the offset information and applying the offset vector to a pre-restored motion vector. The offset information may be signaled in an inter prediction mode in which a separate motion vector difference value (mvd) is not signaled, such as a merge mode.

However, when the length of the offset vector is greater than a predetermined threshold length, motion modification at the decoder side may be applied together with motion modification based on offset information. Here, the threshold length may be an integer of 1, 2, 3, or more. In this case, the motion modification may be performed in the order of motion modification on the decoder side and motion modification based on offset information, or may be performed in the reverse order. Alternatively, when the length of the offset vector is 0, motion modification at the decoder side may be applied.

Motion modification at the decoder side may be performed based on any one of the above-described performance conditions, or motion modification at the decoder side may be performed based on a combination of at least two of the above performance conditions.

The motion modification performance unit 420 on the decoder side includes an L0 direction motion modification unit 421 and an L1 direction motion modification unit 422.

The motion modification performance unit 420 at the decoder side obtains a modified motion having an optimal rate-distortion value with the prediction block by additionally performs motion prediction at the decoder side only for the limited search regions in the L0 and L1 directions using the prediction block obtained by performing the motion compensation 400.

In this case, the limited search regions in the L0 and L1 directions refer to pixel regions spatially adjacent to the reference block before performing motion modification on the decoder side.

The spatially adjacent pixel region may be limited to 8-neighboring pixels based on a position of a corresponding reference block. However, the present invention is not limited thereto, and extending the scope is also included in the present invention.

In obtaining an optimal rate-distortion value by performing additional motion prediction in the search region, unlike the acquisition of the bit rate of the motion vector and the distortion value through block matching in the conventional motion prediction, the decoder side motion modification method proposed by the present invention selects a block with the minimum distortion value in the motion search process as a final reference block by using only the distortion value through block matching without considering the bit rate of the motion vector, and uses the motion vector at this time as the final motion vector.

Specifically, the decoder may determine a search region for motion modification (S1). The search region may be determined as a region including at least one of a reference block or a neighboring region of the reference block. In this case, the position of the top-left sample of the reference block may be the reference position of the search. The search region may be determined for the L0 direction and the L1 direction, respectively. The neighboring region may mean N sample lines adjacent to the boundary of the reference block. Here, N may be an integer of 1, 2, 3 or more.

The neighboring region may be located in at least one of the left, top, right, bottom, top-left, bottom-left, top-right, or bottom-right of the reference block. In this case, when the current block is W×H, the search region may be expressed as (W+2N)×(H+2N). However, in order to reduce the complexity of the motion modification process, the neighboring region may be located only in some of the above-described directions. For example, the neighboring region may be limited to a region adjacent to at least one of the left, top, or top-left of the reference block, or may be limited to a region adjacent to at least one of the right, bottom, or bottom-right of the reference block.

The number of sample lines (N) may be a fixed value pre-defined in the decoder, or may be variably determined in consideration of block properties. Here, the block properties may mean a size/shape of a block, a block position, an inter prediction mode, a component type, and the like. The block position may mean whether the reference block adjoins with a boundary of a picture or a predetermined fragment region.

The fragment region may mean a slice, a tile, a sub-tile (brick), a coding tree block column/row (CTB row/column), or a coding tree block. For example, one of 0, 1, or 2 sample lines may be selectively used according to the block properties.

The decoder may determine a sum of absolute difference (SAD) for each search position in the search region (S2).

Hereinafter, the SAD for each search position will be referred to as an SAD candidate. The number of SAD candidates is M, and M may be an integer greater than or equal to 2. The M may be determined based on the number of sample lines (N) described above. For example, if N is 1, M may be limited to be less than or equal to 9. Alternatively, if N is 2, M may be limited to be less than or equal to 25. Alternatively, M may be less than or equal to 9, regardless of the number of sample lines (N) described above.

The SAD candidate may be determined as an SAD value between the L0 block and the L1 block. In this case, the SAD value may be calculated based on all samples belonging to the L0/L1 blocks, or may be calculated based on some samples in the L0/L1 blocks. Here, some samples belong to a partial region of the L0/L1 block, and at least one of the width or the height of the partial region may be half of the width or the height of the L0/L1 block. That is, the L0 and L1 blocks have a size of W×H, and the some samples may belong to a partial region having a size of W×H/2, W/2×H, or W/2×H/2. In this case, when the partial region is W×H/2, some samples may belong to a top region (or a bottom region) within the L0/L1 block. When the partial region is W/2×H, some samples may belong to the left region (or the right region) within the L0/L1 block. When the partial region is W/2×H/2, some samples may belong to the top-left region within the L0/L1 block, but the present invention is not limited thereto. Alternatively, some samples may be defined as a group of even-numbered or odd-numbered sample lines (vertical or horizontal direction) of an L0/L1 block or a partial region. In addition, some samples may be a block obtained by sub-sampling the L0/L1 block or the partial region in the vertical and/or horizontal directions. That is, the L0 and L1 blocks have a size of W×H, and the block corresponding to the some samples may be at least one of a set of odd rows, a set of even rows, a set of odd columns, or a set of even columns among samples included in the L0/L1 block or the partial region. The positions of some samples described above will be further described with reference to FIGS. 7 and 8.

The position of the L0 block may be determined based on the position of the L0 reference block of the current block and a predetermined offset. The offset may mean a disparity vector between the position of the L0 reference block and the search position. That is, the search position may be a position shifted by p in the x-axis direction and q in the y-axis direction from the position (x0,y0) of the L0 reference block. Here, p and q may be at least one of −1, 0, or 1. In this case, a disparity vector generated by a combination of p and q may mean an offset. The position of the L0 block may be determined as a position shifted by (p,q) from the position (x0,y0) of the L0 reference block. The sizes (or absolute values) of p and q are 0 or 1, but are not limited thereto. For example, p and q may be integers having a size of 2, 3, or more.

The offset may include at least one of a non-directional offset (0,0) or a directional offset. The directional offset may include an offset with respect to at least one direction of left, right, top, bottom, top-left, top-right, bottom-left, or bottom-right. For example, the directional offset may include at least one of (−1,0), (0,1), (0,−1), (0,1), (−1,−1), (−1,1), (1,−1) or (1,1).

Likewise, the position of the L1 block may be determined based on the position of the L1 reference block of the current block and a predetermined offset. Here, the offset of the L1 block may be determined based on the offset of the L0 block. For example, when the offset of the L0 block is (p,q), the offset of the L1 block may be determined as (−p, −q).

The information on the size and/or direction of the offset described above may be pre-defined in the decoder, or may be encoded in the encoder and signaled to the decoder. The information may be variably determined in consideration of the above-described block properties.

As an example, the offset may be defined as shown in Table 1 below.

TABLE 1

| i | 0 | 1 | 2 | 3 | 4 | 5 | 6 | 7 | 8 |
|---|---|---|---|---|---|---|---|---|---|
| dX [i] | −1 | 0 | 1 | −1 | 0 | 1 | −1 | 0 | 1 |
| dY [i] | −1 | −1 | −1 | 0 | 0 | 0 | 1 | 1 | 1 |

Table 1, for each index i, defines an offset for determining a search position. However, Table 1 does not limit the position of the offset corresponding to the index i, and the position of the offset for each index may be different from Table 1. The offset according to Table 1 may include the aforementioned non-directional offset (0,0) and eight directional offsets.

In this case, the 0-th SAD candidate may be determined based on the position (x,y) of the reference block and the offset (−1,−1). Specifically, a position shifted by an offset (−1,−1) from the position (x0,y0) of the L0 reference block is set as the search position, and a W×H block including the search position as the top-left sample may be determined as the L0 block.

likewise, a position shifted by an offset (1,1) from the position (x1,y1) of the L1 reference block may be set as the search position, and a W×H block including the search position as the top-left sample may be determined as the L1 block. The 0-th SAD candidate may be determined by calculating the SAD between the L0 block and the L1 block.

Through the above-described process, first to eighth SAD candidates may be determined, and an SAD array including 9 SAD candidates may be determined.

Table 1 does not limit the number of offsets for motion modification. Of the nine offsets, only k offsets may be used. Here, k may be any value among 2 to 8. For example, in Table 1, three offsets such as [0,4,8], [1,4,7], [2,4,6], [3,4,5], etc. may be used, four offsets such as [0,1,3,4], [4,5,7,8], etc. may be used, and six offsets such as [0,1,3,4,6,7], [0,1,2,3, 4,5], etc. may be used.

As an example, the offset may be defined as shown in Table 2 below. That is, the offset may be composed of only a non-directional offset (0,0), an offset in the horizontal direction ((−1,0), (1,0)) and an offset in the vertical direction ((0,−1), (0,1)).

TABLE 2

| i | 0 | 1 | 2 | 3 | 4 |
|---|---|---|---|---|---|
| dX[ i ] | 0 | −1 | 0 | 1 | 0 |
| dY[ i ] | −1 | 0 | 0 | 0 | 1 |

As an example, the offset may be defined as shown in Table 3 below.

TABLE 3

| i | 0 | 1 | 2 | 3 | 4 |
|---|---|---|---|---|---|
| dX[ i ] | −2 | −1 | 0 | 1 | 2 |
| dY[ i ] | −2 | −2 | −2 | −2 | −2 |
| i | 5 | 6 | 7 | 8 | 9 |
| dX[ i ] | −2 | −1 | 0 | 1 | 2 |
| dY[ i ] | −1 | −1 | −1 | −1 | −1 |
| i | 10 | 11 | 12 | 13 | 14 |
| dX[ i ] | −2 | −1 | 0 | 1 | 2 |
| dY[ i ] | 0 | 0 | 0 | 0 | 0 |
| i | 15 | 16 | 17 | 18 | 19 |
| dX[ i ] | −2 | −1 | 0 | 1 | 2 |
| dY[ i ] | 1 | 1 | 1 | 1 | 1 |
| i | 20 | 21 | 22 | 23 | 24 |
| dX[ i ] | −2 | −1 | 0 | 1 | 2 |
| dY[ i ] | 2 | 2 | 2 | 2 | 2 |

Table 3 defines an offset for determining a search position for each index i. However, Table 3 does not limit the position of the offset corresponding to the index i, and the position of the offset for each index may be different from Table 3. The offset according to Table 3 may include the aforementioned non-directional offset (0,0) and 24 directional offsets.

In this case, the 0-th SAD candidate may be determined based on the position (x,y) of the reference block and the offset (−2,−2). Specifically, a position shifted by an offset (−2,−2) from the position (x0,y0) of the L0 reference block is set as the search position, and a W×H block including the search position as the top-left sample may be determined as the L0 block.

Likewise, a position shifted by an offset (2,2) from the position (x1,y1) of the L1 reference block may be set as the search position, and a W×H block including the search position as the top-left sample may be determined as the L1 block. The 0-th SAD candidate may be determined by calculating the SAD between the L0 block and the L1 block.

Through the above-described process, the 1st to 24th SAD candidates may be determined, and an SAD array including 25 SAD candidates may be determined.

In this way, according to the size and/or number of offsets, the size and/or shape of the above-described search region may be variably determined, and the number of SAD candidates may be determined.

The decoder may perform motion modification of the current block based on the determined SAD candidates (S3).

First, it is possible to identify an SAD candidate having a minimum value among a plurality of SAD candidates. A method of identifying the SAD candidate having the minimum value will be described. The sizes between the first SAD candidate and the second SAD candidate may be compared. A small candidate among the first SAD candidate and the second SAD candidate may be set as the SAD candidate (minSad) having the minimum value. The comparison between the minSad and the third SAD candidate may be performed, and minSad may be updated in the same manner. By performing the comparison process as many as the number of offsets described above, the final minSad may be determined.

Alternatively, as an example, a plurality of SAD candidates may be grouped into two, three, or more. Hereinafter, for convenience of description, a case of grouping the SAD candidates into two groups will be described.

The plurality of SAD candidates may be grouped into a first group and a second group. Each group may include at least two SAD candidates. However, the group may be limited so that the reference SAD candidate is not included. By applying the minimum operation to each group, the SAD candidate having a minimum value for each group may be extracted.

An SAD candidate (hereinafter, referred to as temporary SAD candidate) having a minimum value among the SAD candidate extracted from the first group and the SAD candidate extracted from the second group may be extracted again.

Based on the comparison result between the temporary SAD candidate and the reference SAD candidate, the SAD candidate having the minimum value may be identified. For example, when the temporary SAD candidate is smaller than the reference SAD candidate, the temporary SAD candidate may be identified as a SAD candidate having a minimum value among a plurality of SAD candidates. On the other hand, when the temporary SAD candidate is greater than or equal to the reference SAD candidate, the reference SAD candidate may be identified as a SAD candidate having a minimum value among a plurality of SAD candidates.

Delta motion information may be derived based on the offset corresponding to the identified SAD candidate having a minimum value. The pre-restored motion information may be modified using the derived delta motion information.

The motion information of the current block may be obtained through at least one of motion modification at the decoder side described above or modification based on differential motion information.

However, the above-described motion modification at the decoder side may be adaptively performed based on a comparison result between the reference SAD candidate and a predetermined threshold value. The reference SAD candidate may mean an SAD candidate corresponding to an offset (0, 0). Alternatively, the reference SAD candidate may mean an SAD candidate corresponding to a position of a reference block or a reference location changed by a first method to be described later. The threshold value may be determined based on at least one of a width (W) or a height (H) of a current block or a reference block. Alternatively, when the current block performs motion modification on a sub-block basis, it may be determined based on at least one of a width (W) or a height (H) of the sub-block. For example, the threshold value may be determined as W*H, W*(H/2), (W/2)*H, 2*W*H, 4*W*H, 8*W*H, 16*W*H, etc.

When the reference SAD candidate is greater than or equal to a threshold value, delta motion information may be derived based on a method to be described later. On the other hand, when the reference SAD candidate is smaller than the threshold value, motion modification may not be performed.

Also, a search position corresponding to the identified SAD candidate may be changed to a reference position for search. Based on the changed reference position, the above-described processes of determining the SAD candidate and/or identifying the SAD candidate having the minimum value may be re-performed, and redundant descriptions will be omitted. The delta motion information may be updated based on the re-performance result.

In addition, instead of the SAD, motion modification may be performed based on a sum of absolute transform difference (SAID) for each search position. For example, a difference block between the L0 block and the L1 block may be generated, and all or some samples in the difference block may be transformed into the frequency domain to determine the SAID candidate. Here, the region of some samples is as described above, and detailed descriptions will be omitted. The transform may be performed in units of n*m subblocks, and n and m may be integers of 4, 8 or more. The transform may be performed based on Hadamard transformation, DCT, DST, or the like. The transform may include at least one of a first transform or a second transform. The second transform may mean a secondary transform that is additionally applied to the result value of the first transform, and in this case, it may be applied only to the DC component of the result value of the first transform.

Then, based on an offset corresponding to the SATD candidate having a minimum value among the SATD candidates, the delta motion information may be derived, and pre-restored motion information may be modified using this. The SAD-based motion modification method may be applied in the same/similar manner to the SATD-based motion modification method, and a detailed description thereof will be omitted.

The modified motion-based motion compensation step 430 shown in FIG. 4 is a step of performing bi-directional motion compensation based on the modified L0 motion and L1 motion obtained through the motion modification performance unit 420 at the decoder side.

Figure 5:
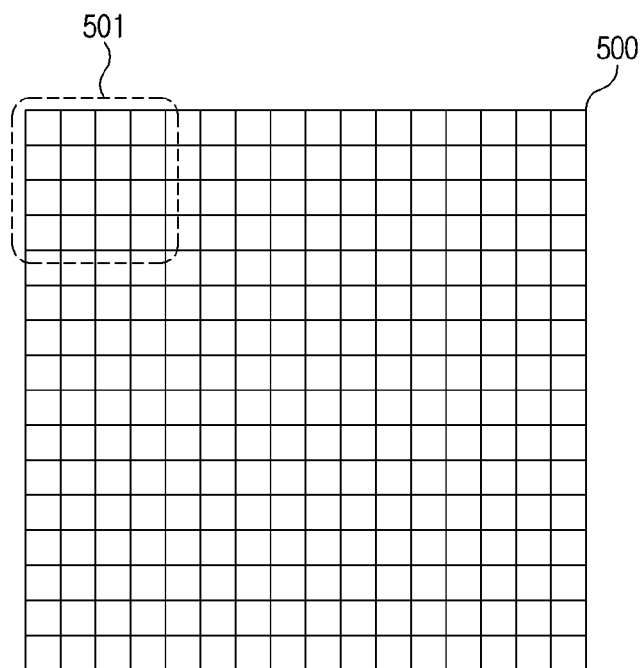
FIG. 5 is a diagram illustrating a concept of one coding block and a sub-block of the corresponding coding block.

FIG. 5 is a diagram illustrating the concept of one coding block and a sub-block of the corresponding coding block. In particular, FIG. 3 is a diagram illustrating the concept of one coding block 500 and a sub-block 501 of the corresponding coding block. In FIG. 5, a coding block having a size of 16×16 is shown as an embodiment, and the corresponding coding block is divided into a total of 16 sub-blocks having a size of 4×4.

FIG. 5 shows the concept of one coding block 500 and its sub-blocks prior to the description of the motion modification technique at the decoder side in units of sub-blocks, which is an embodiment of the motion modification technique at the decoder side proposed in the present invention.

In general, it includes dividing one coding block using a fixed block size of 4×4 as a sub-block.

However, the size of the sub-block may be transmitted by signaling through additional high-level syntax in addition to the fixed size of 4×4.

Alternatively, it may be calculated in consideration of the motion information of the current block, the size of the block, etc. For example, when the width of the current block is greater than or equal to a predetermined threshold size, the sub-block may have the same width as the threshold size, otherwise, the sub-block may have the same width as the current block. Likewise, when the height of the current block is greater than or equal to a predetermined threshold size, the sub-block may have the same height as the threshold size, otherwise, the sub-block may have the same height as the current block. Here, the threshold size may be an integer of 16, 32, 64 or more.

Figure 6:
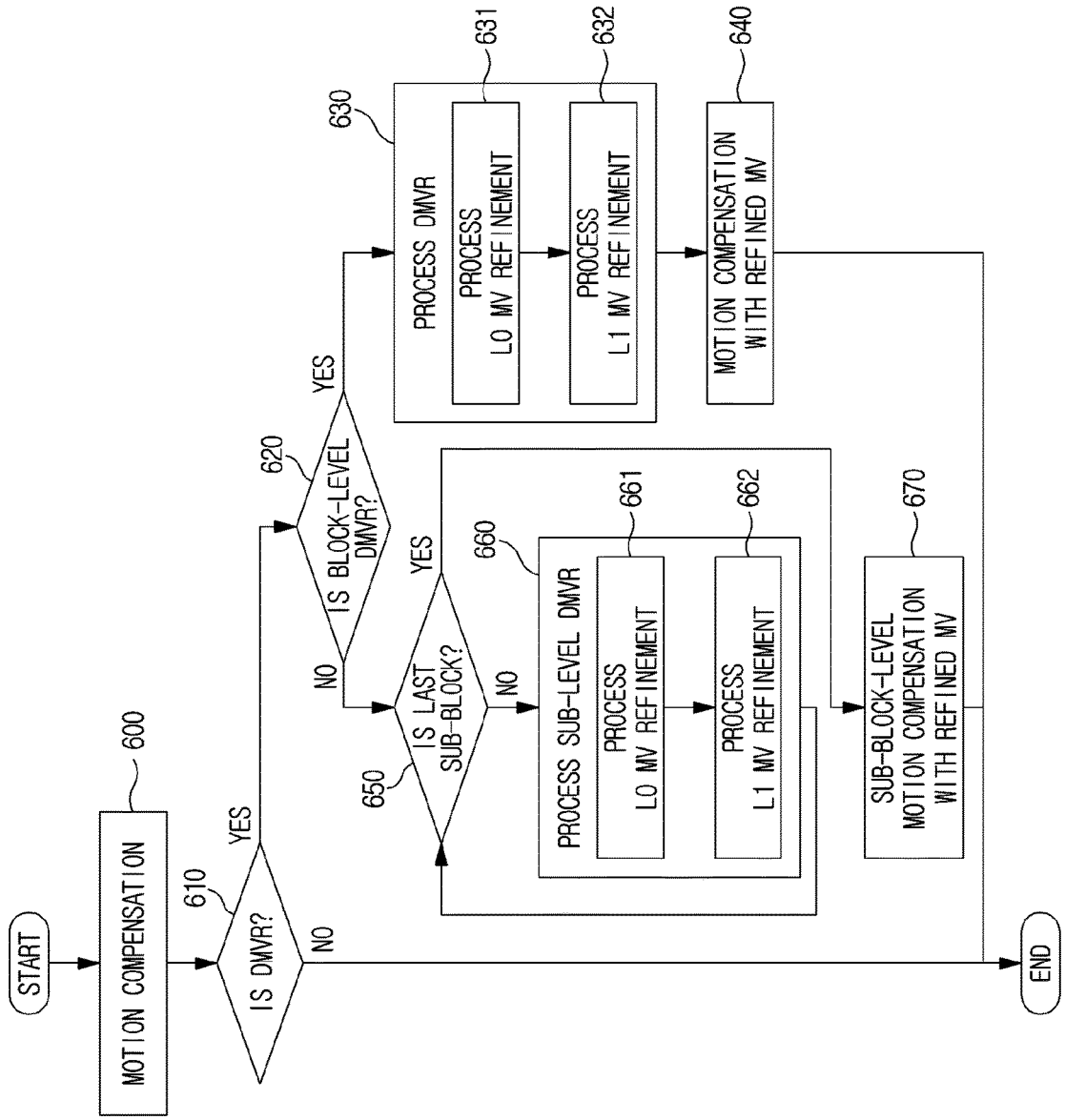
FIG. 6 is a diagram illustrating a flowchart of a sub-block-based motion modification technique at the decoder side.

FIG. 6 is a diagram showing a flowchart of a motion modification technique at the decoder side in units of sub-blocks. In particular, FIG. 6 is a diagram showing a flowchart of a technique for motion modification at the decoder side in units of sub-blocks, in which when the current block is a block predicted by bi-prediction, motion is modified by performing an additional motion prediction process in units of sub-blocks or blocks in a decoder using a prediction block generated by a conventional prediction method.

As shown in FIG. 6, the motion modification technology at the decoder side is based on performing a conditional operation in relation to motion compensation.

The motion compensation technique using the motion modification technique at the decoder side in sub-block units may include a motion derivation and/or motion compensation step 600 according to a predetermined inter prediction mode; a motion modification performance determination unit 610 on the decoder side; and a sub-block level performance determination unit 620. In the case of performing motion modification on the decoder side in units of sub-blocks, it may include the motion modification performance unit 660 at the decoder side in units of sub-blocks, which divide the current coding block into a plurality of sub-blocks and repeat until the last sub-block, and the modified motion-based motion compensation unit 670 in units of sub-blocks. When the motion modification at the decoder side in sub-block units is not performed, it may include a motion modification performance unit 630 on the decoder side in the coding block unit; and a motion compensation step 640 based on the modified motion.

The motion modification performance determining unit 610 on the decoder side determines whether the current block performs motion modification. The determination is performed using encoding mode information of a current coding unit, an inter prediction directionality, a block size, a distance between a current picture and a reference picture, an inter prediction mode, a prediction direction, a unit or a resolution of motion information, without signaling information for performing motion modification at the decoder side in units of coding units. However, signaling at the sequence level for performing motion modification at the decoder side may be performed.

In this case, as an embodiment using the inter prediction directionality, when bi-directional prediction is not performed, motion modification at the decoder side is not performed. However, even when bi-directional prediction is performed, motion modification at the decoder side is not performed in case of bi-directional prediction using the same temporal direction.

The encoding mode information of the current coding unit may include whether to merge motion of the current prediction unit, whether to perform affine transform prediction. In an embodiment, when the current prediction unit performs motion merging, motion modification at the decoder side may be performed.

The encoding mode information of the current coding unit may include whether to merge motion of the current prediction unit, whether to perform affine transform prediction.

In an embodiment, when the current prediction unit performs motion merging, motion modification at the decoder side may be performed. However, in the case of a motion merge candidate that performs sub-block unit motion prediction among the motion merge candidates, motion modification at the decoder side is not performed.

Alternatively, when the current prediction unit performs sub-block-based motion merging, sub-block-based motion modification on the decoder side may be performed without additional determination.

In an embodiment, when the current prediction unit performs affine transform prediction, motion modification at the decoder side is not performed.

Motion modification on the decoder side may be performed only when any one of the width or the height of the current block is greater than or equal to 8, 16, or 32. Alternatively, motion modification at the decoder side may be performed only when the width and the height of the current block are greater than or equal to 8, 16, or 32. Alternatively, motion modification at the decoder side may be performed only when the area or the number of samples of the current block is greater than or equal to 64, 128, or 256.

Motion modification at the decoder side may be performed only when the picture order count (POC) difference between the current picture and the L0 reference picture and the POC difference between the current picture and the L1 reference picture are the same.

Motion modification at the decoder side may be performed only when the ratio of the weights for bi-directional prediction is 1:1.

The motion modification at the decoder side may be performed only when the unit of motion is an integer pel, or motion modification at the decoder side may be performed only when the unit of motion is equal to or less than the quarter pel or half pel.

As shown in FIG. 6, it may include a step 620 of determining whether the current coding block performs coding block-based motion modification on the decoder side or sub-block-based motion modification.

As in the above embodiment, whether to perform sub-block-based motion modification on the decoder side or whether to perform coding block-based motion modification on the decoder side may be determined using information on the current coding block without additional signaling.

In this case, the information on the current coding block may indicate whether to perform motion merging and whether to perform sub-block-based motion merging.

Further, the information on the current coding block may include motion information spatially and temporally adjacent to the current block.

Alternatively, whether to perform sub-block-based motion modification may be determined based on the size of the current block. For example, when the size of the current block is greater than a predetermined threshold size, the current block performs motion modification in sub-block units, otherwise, the current block may not perform motion modification in sub-block units. Here, the size of the current block may mean at least one of a width or a height of the current block. The threshold size may be 16, 32 or more.

For example, if the current block is 16×32 and the threshold size is 16, since the height of the current block is greater than 16, the current block may perform motion modification in units of sub-blocks. Meanwhile, when the current block is 16×8 and the threshold size is 16, since both the width and the height of the current block are not greater than 16, motion modification in units of sub-blocks may not be performed on the current block.

In the case of performing sub-block-based motion modification on the decoder side, one coding block is divided into a plurality of sub-blocks. In this case, the number of the plurality of sub-blocks may be defined by a size of a predefined sub-block and a size of a current coding block.

In this case, the size of the predefined sub-block may be 4×4. Alternatively, it may be 8×8 or 16×16, which may be predefined or transmitted through high-level syntax. A method of dividing into sub-blocks has been described with reference to FIG. 5, and a detailed description thereof will be omitted.

The sub-block-based motion modification performance unit 660 at the decoder side includes a L0 direction motion modification unit 661 and a L1 direction motion modification unit 662.

The sub-block-based motion modification performance unit 660 at the decoder side obtains the sub-prediction block and the modified sub-block-based motion having an optimal rate-distortion value by performing additional motion prediction at the decoder side for the limited search region in the L0 and L1 directions. The additional motion prediction is performed by using the sub-prediction blocks. The sub-prediction blocks are obtained by dividing the prediction block obtained by performing motion compensation 600 into a plurality of sub-blocks.

In this case, the limited search region in the L0 and L1 directions refers to a pixel region spatially adjacent to the reference block before performing motion modification on the decoder side.

The spatially adjacent pixel region may be limited to 8-neighboring pixels based on a position of a corresponding reference block. However, the present invention is not limited thereto, and extending the scope is also included in the present invention.

In obtaining an optimal rate-distortion value by performing additional motion prediction in the search region, unlike the acquisition of the bit rate of a motion vector and a distortion value through block matching in the existing motion prediction, the decoder side motion modification method proposed by the present invention selects a block with the minimum distortion value in the motion search process as a final reference block by using only the distortion value through block matching without considering the bit rate of the motion vector, and uses the motion vector at this time as the final motion vector.

A method of 1) determining a predetermined search region for motion modification, 2) determining an SAD candidate in the search region, and 3) performing motion modification is the same as described in S1 to S3, and detailed descriptions will be omitted. However, when the current block performs motion modification in units of sub-blocks, the search region may be determined based on a sub-block other than the current block.

The motion compensation step 670 based on the modified motion in units of sub-blocks shown in FIG. 6 is a step of performing bi-directional motion compensation based on the modified L0 motion and L1 motion of the sub-block unit obtained through the sub-block-based motion modification performance unit 660 at the decoder side.

Figure 7:
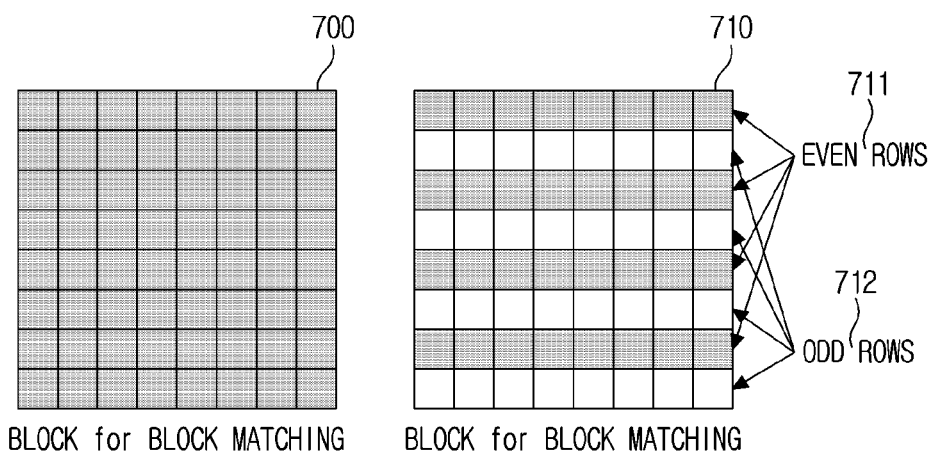
FIG. 7 is a diagram illustrating a target block performing block matching and target pixels in the corresponding block.
Figure 7:
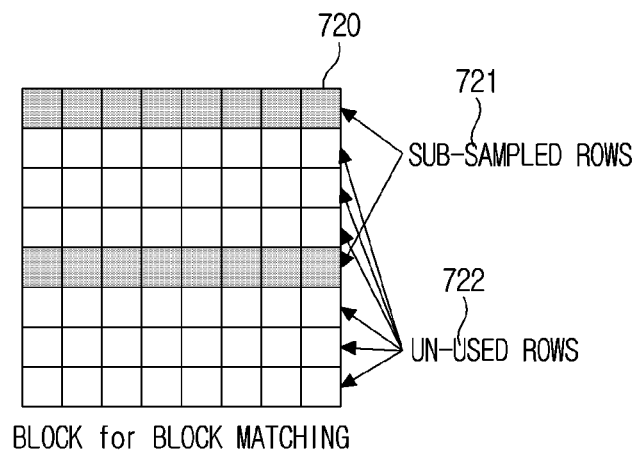

FIG. 7 is a diagram illustrating a target block performing block matching and target pixels in the corresponding block. 700 shows a method of calculating an error between the target block and the reference block using all pixels in the block in general block matching, and 710 and 720 show an example of a method of calculating an error between a target block and a reference block using only some pixels in the block to reduce the computational complexity required for block matching.

According to an embodiment of the present invention, a block 710 is classified into pixels belonging to even rows 711 and pixels belonging to odd rows 712. In calculating a block matching cost, an error between blocks, etc., computational complexity can be reduced by calculating using only pixels belonging to even rows or pixels belonging to odd rows.

In this case, the criteria for classifying target pixels used for matching in order to reduce the computational complexity is not limited to even rows and odd rows, and a method of determining the target row by skipping in units of integer rows that is a multiple of 2 may also be included.

According to an embodiment of the present invention for reducing the computational complexity, block 720 shown in FIG. 7 represents an embodiment in which rows which are multiple of 4 are used.

Figure 8:
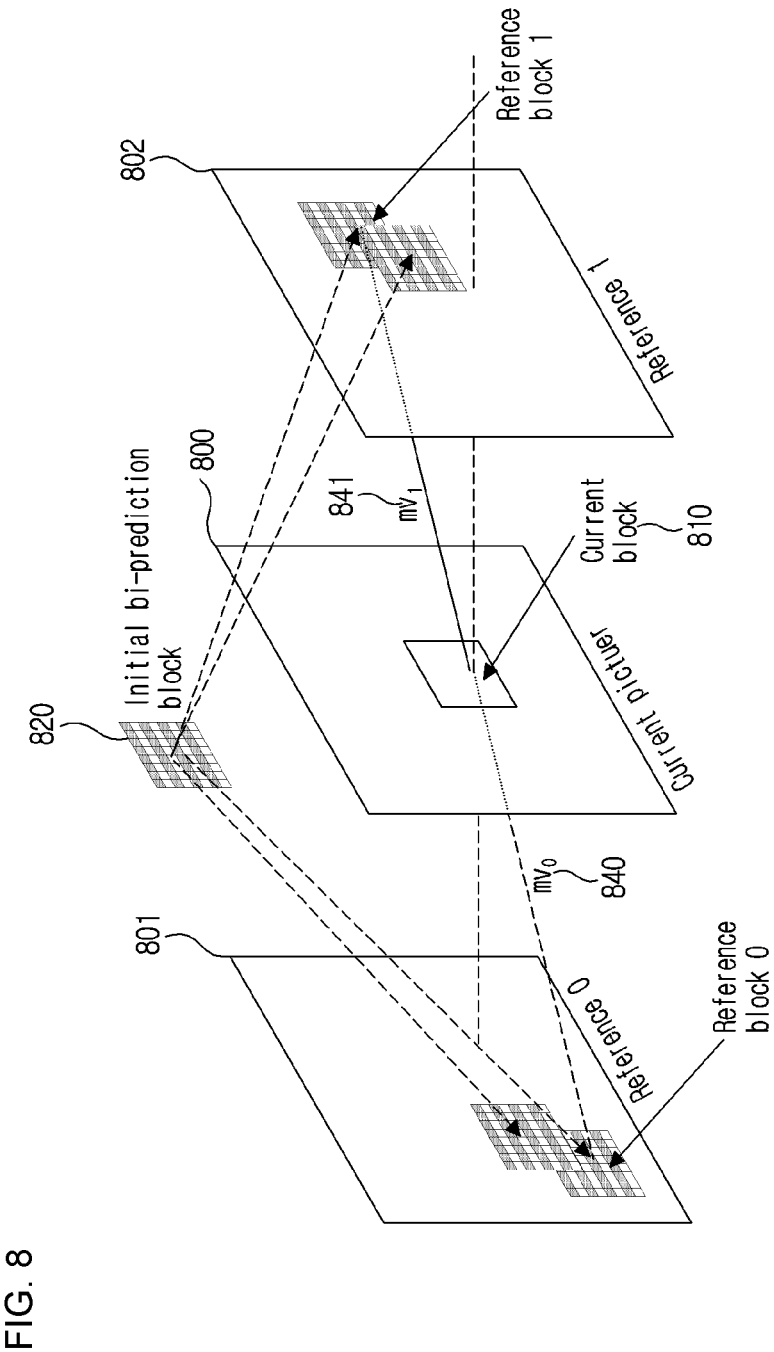
FIG. 8 is a diagram illustrating a concept of performing motion modification at the decoder side using a sub-sampled block.

FIG. 8 is a diagram illustrating a concept of performing motion modification at the decoder side using a sub-sampled block. As shown in FIG. 8, a process of searching for optimal motion information is performed in the process of modifying motion information at the decoder side for a current block predicted by bi-prediction. In this case, in the process of calculating the distortion value of the block, it is possible to reduce the computational complexity by not using all the pixels included in the block, but using only some pixels in the block.

Figure 9:
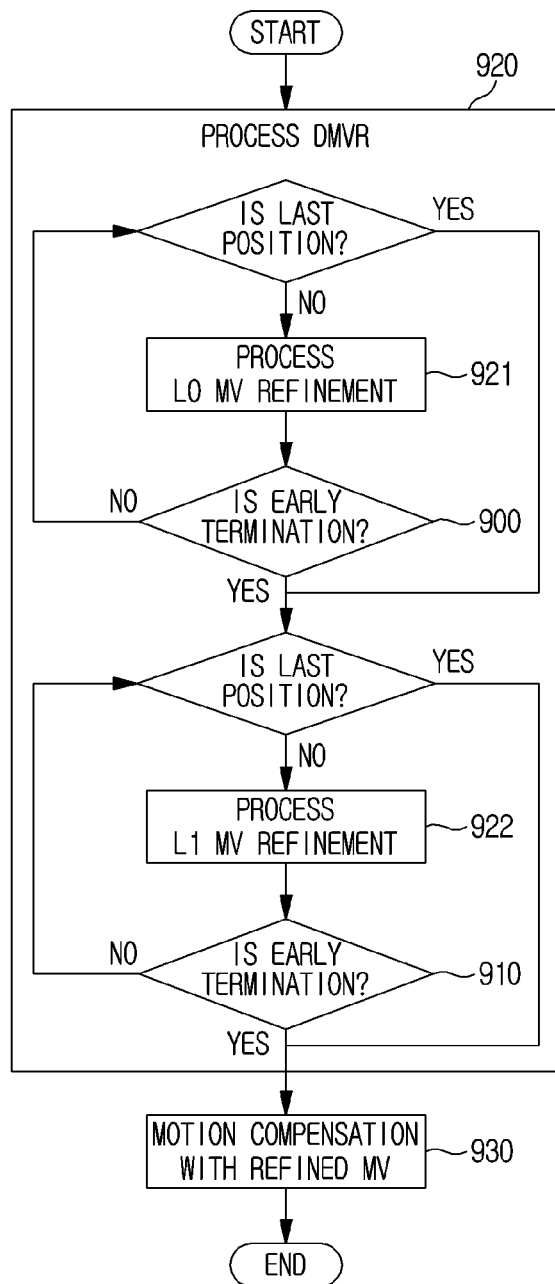
FIG. 9 is a diagram illustrating a flowchart of performing early termination when a specific condition is satisfied in a process of performing motion modification at the decoder side.

FIG. 9 is a diagram illustrating a flowchart of performing early termination when a specific condition is satisfied in a process of performing motion modification at the decoder side. FIG. 9 is a diagram showing in more detail the motion modification performance units 420, 630, and 650 at the decoder side in the process of modifying the motion at the decoder side as described above. FIG. 9 is a flowchart illustrating an early termination method for motion modification at the decoder side proposed by the present invention.

The motion modification performance unit at the decoder side proposed in the present invention performs motion search on positions spatially adjacent to an existing reference block in the L0 direction and the L1 direction, respectively. In this case, computational complexity may be reduced by using all or only some pixels in the block.

In this case, when a specific condition is satisfied by calculating a distortion value for a block corresponding to a position spatially adjacent to the existing reference block, additional motion search may be terminated early.

In this case, the specific condition may be a case that is less than a certain value compared to the distortion value of the initial reference block. For example, when the reference SAD candidate is less than a certain value, motion modification at the decoder side is not performed and may be terminated early. Here, the certain value may be determined based on at least one of the width (W) or the height (H) of the current block or the reference block. Alternatively, when the current block performs motion modification on a sub-block basis, it may be determined based on at least one of a width (W) or a height (H) of the sub-block. As an example, the certain values may be determined as W*H, W*(H/2), (W/2)*H, 2*W*H, 4*W*H, 8*W*H, or 16*W*. Alternatively, the certain value may be expressed as a ratio of 0.9, 0.75, or the like.

Various embodiments of the present disclosure are not listed in all possible combinations, but are intended to describe representative aspects of the present disclosure, and matters described in the various embodiments may be applied independently or may be applied in combination of two or more.

In addition, various embodiments of the present disclosure may be implemented by hardware, firmware, software, or a combination thereof. For implementation by hardware, it may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processor (general processor), a controller, a microcontroller, a microprocessor, or etc.

The scope of the present disclosure includes software or machine-executable instructions (e.g., operating systems, applications, firmware, programs, etc.) that allow an operation according to a method of various embodiments to be executed on a device or computer, and a non-transitory computer-readable medium (non-transitory computer-readable medium) which stores such software or instructions and is executable on a device or a computer.

INDUSTRIAL APPLICABILITY

The present invention may be used to encode/decode a video signal.

The invention claimed is:

1. A method of decoding an image, comprising:
   determining, based on a pre-defined condition, whether to perform motion modification on a current block in the image;
   determining whether the motion modification is performed in units of sub-blocks when it is determined that the motion modification is performed on the current block;
   determining a search region for the motion modification of the current block;
   deriving delta motion information of the current block based on a plurality of SAD candidates in the search region; and
   modifying initial motion information of the current block by using the delta motion information,
   wherein whether the motion modification is performed in units of sub-blocks is determined based on a comparison result between a size of the current block and a pre-defined threshold size,
   wherein, in response to a case where the motion modification is performed in units of sub-blocks, the current block is divided into a plurality of sub-blocks having the pre-defined threshold size,
   wherein the motion modification of the current block is performed only when a picture order count (POC) difference between a current picture including the current block and an L0 reference picture is the same as a POC difference between the current picture and an L1 reference picture,
   wherein the L0 reference picture and the L1 reference picture have different temporal directions,
   wherein, in response to a case where an initial SAD is less than a specific value, a search for the plurality of SAD candidates in the search region is not performed even though it is determined that the motion modification is performed on the current block, and
   wherein the initial SAD is derived based on reference blocks specified by the initial motion information of the current block.

2. The method of claim 1, wherein the search region is determined as a region including at least one of a reference block or a neighboring region of the reference block, and
   wherein the neighboring region is N sample lines neighboring to a boundary of the reference block.

3. The method of claim 1, wherein each of the SAD candidates is determined as an SAD value between an L0 block and an L1 block, and
   wherein the L0 block is determined based on a position of an L0 reference block of the current block and a predetermined offset and the L1 block is determined based on a position of an L1 reference block of the current block and the predetermined offset.

4. The method of claim 3, wherein the SAD value is calculated using samples belonging to even rows, not samples belonging to all rows of the L0 block and the L1 block.

5. The method of claim 3, wherein the predetermined offset includes at least one of a non-directional offset or a directional offset, and
   wherein the directional offset includes an offset for at least one direction of a left, a right, a top, a bottom, a top-left, a top-right, a bottom-left or a bottom-right.

6. The method of claim 1, wherein a first weight and a second weight for bi-prediction of the current block are applied to the L0 reference picture and the L1 reference picture, respectively, and
   wherein the motion modification of the current block is performed only when the first weight is equal to the second weight.

7. The method of claim 6, wherein the motion modification of the current block is performed only when a width and a height of the current block are greater than or equal to 8, respectively, and a number of samples included in the current block is greater than or equal to 128.

8. The method of claim 1, wherein the pre-defined threshold size is equal to 16×16.

9. The method of claim 1, wherein the motion modification of the current block is performed only when a combined prediction mode is not applied to the current block, and
   wherein the combined prediction mode is a prediction mode combining intra prediction and inter prediction.

10. The method of claim 1, wherein, in response to a case where it is determined that the motion modification is not performed in units of sub-blocks, the specific value is determined using a width and a height of the current block, and
    wherein, in response to a case where it is determined that the motion modification is performed in units of sub-blocks, the specific value is determined using a width and a height of a sub-block belonging to the current block.

11. A method of encoding an image, the method comprising:
    determining, based on a pre-defined condition, whether to perform motion modification on a current block in the image;
    determining whether the motion modification is performed in units of sub-blocks when it is determined that the motion modification is performed on the current block;
    determining a search region for the motion modification of the current block;
    deriving delta motion information of the current block based on a plurality of SAD candidates in the search region; and
    modifying initial motion information of the current block by using the delta motion information,
    wherein whether the motion modification is performed in units of sub-blocks is determined based on a comparison result between a size of the current block and a pre-defined threshold size,
    wherein, in response to a case where the motion modification is performed in units of sub-blocks, the current block is divided into a plurality of sub-blocks having the pre-defined threshold size,
    wherein the motion modification of the current block is performed only when a picture order count (POC) difference between a current picture including the current block and an L0 reference picture is the same as a POC difference between the current picture and an L1 reference picture,
    wherein the L0 reference picture and the L1 reference picture have different temporal directions,
    wherein, in response to a case where an initial SAD is less than a specific value, a search for the plurality of SAD candidates in the search region is not performed even though it is determined that the motion modification is performed on the current block, and wherein the initial SAD is derived based on reference blocks specified by the initial motion information of the current block.

12. A non-transitory computer-readable storage medium having instructions stored thereon that, when executed, cause one or more processor to:

determining, based on a pre-defined condition, whether to perform motion modification on a current block;

determining whether the motion modification is performed in units of sub-blocks when it is determined that the motion modification is performed on the current block;

determining a search region for the motion modification of the current block;

deriving delta motion information of the current block based on a plurality of SAD candidates in the search region; and modifying initial motion information of the current block by using the delta motion information, wherein whether the motion modification is performed in units of sub-blocks is determined based on a comparison result between a size of the current block and a pre-defined threshold size, wherein, in response to a case where the motion modification is performed in units of sub-blocks, the current block is divided into a plurality of sub-blocks having the pre-defined threshold size, wherein the motion modification of the current block is performed only when a picture order count (POC) difference between a current picture including the current block and an L0 reference picture is the same as a POC difference between the current picture and an L1 reference picture, wherein the L0 reference picture and the L1 reference picture have different temporal directions, wherein, in response to a case where an initial SAD is less than a specific value, a search for the plurality of SAD candidates in the search region is not performed even though it is determined that the motion modification is performed on the current block, and wherein the initial SAD is derived based on reference blocks specified by the initial motion information of the current block.

13. A device having instructions for transmitting a bitstream generated by an encoding method, wherein the encoding method comprises:

determining, based on a pre-defined condition, whether to perform motion modification on a current block;

determining whether the motion modification is performed in units of sub-blocks when it is determined that the motion modification is performed on the current block;

determining a search region for the motion modification of the current block;

deriving delta motion information of the current block based on a plurality of SAD candidates in the search region; and modifying initial motion information of the current block by using the delta motion information, wherein whether the motion modification is performed in units of sub-blocks is determined based on a comparison result between a size of the current block and a pre-defined threshold size, wherein, in response to a case where the motion modification is performed in units of sub-blocks, the current block is divided into a plurality of sub-blocks having the pre-defined threshold size, wherein the motion modification of the current block is performed only when a picture order count (POC) difference between a current picture including the current block and an L0 reference picture and a POC difference between the current picture and an L1 reference picture are the same, wherein the L0 reference picture and the L1 reference picture have different temporal directions, wherein, in response to a case where an initial SAD is less than a specific value, a search for the plurality of SAD candidates in the search region is not performed even though it is determined that the motion modification is performed on the current block, and wherein the initial SAD is derived based on reference blocks specified by the initial motion information of the current block.

* * * * *